May 30, 1961

D. V. MAGNUSON ET AL 2,986,280

CHROMATOGRAPHIC SEPARATION APPARATUS

Filed May 16, 1957

Inventors.
Donald V. Magnuson
Hugh J. McDonald

By Zabel, Baker, York, Jones & Dithmar
Attorneys

May 30, 1961  D. V. MAGNUSON ET AL  2,986,280
CHROMATOGRAPHIC SEPARATION APPARATUS
Filed May 16, 1957                                  2 Sheets-Sheet 2
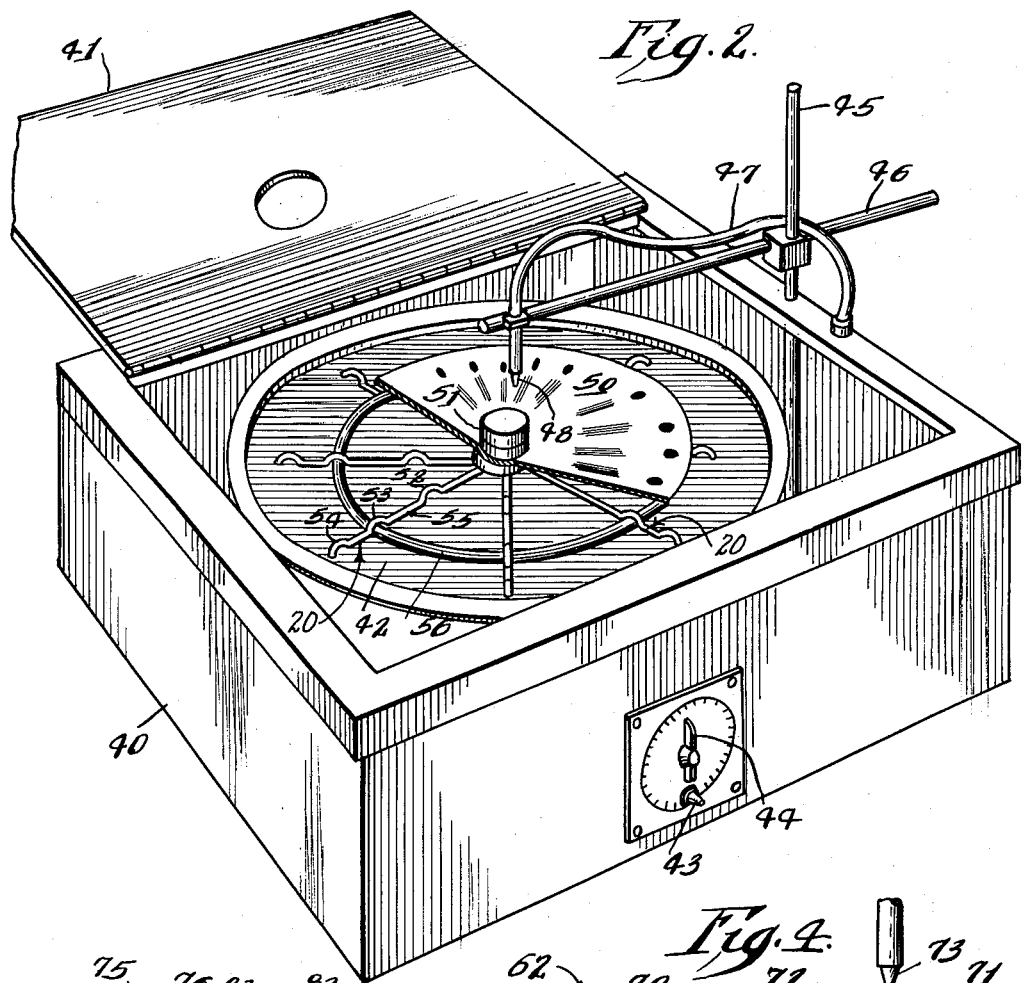
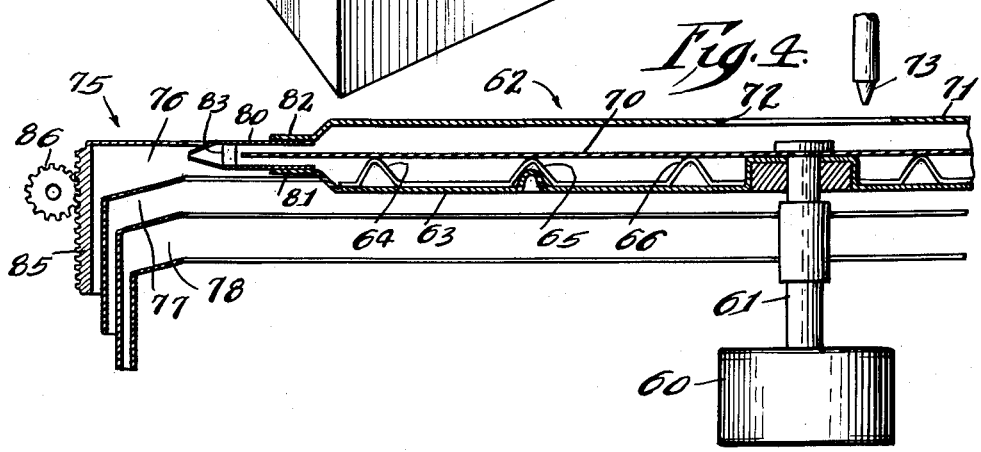
Inventors.
Donald V. Magnuson
Hugh J. McDonald.
By- Zabel, Baker, York, Jones & Dithmar
Attorneys.

United States Patent Office 2,986,280
Patented May 30, 1961

2,986,280
CHROMATOGRAPHIC SEPARATION APPARATUS
Donald V. Magnuson and Hugh J. McDonald, Skokie, Ill., assignors to Labline, Inc., Chicago, Ill., a corporation of Illinois
Filed May 16, 1957, Ser. No. 659,672
3 Claims. (Cl. 210—198)

This invention relates to chromatography, and more particularly to an improved disk type method and apparatus for obtaining chromatographic separations of migratory substances. In another aspect, the invention relates to methods and apparatus for separating and collecting desired individual fractions of such substances.

Chromatography, briefly described, contemplates the separation of substances from a mixture by (1) the passage of a developing solvent in a definite direction and (2) selective fixation, the action taking place on a sheet of absorbent material such, for example, as filter paper.

One object of the invention is to provide a chromatographic method and apparatus which yield a chromatographic separation in an extremely short period of time compared with the time required with prior methods and apparatus.

Another object is to provide a chromatographic method and apparatus wherein the results obtained have greater accuracy and uniformity than heretofore. This, in part, is due to the elimination of decomposition resulting from extended time periods and adverse atmospheric conditions.

Another object is to provide a chromatographic method and apparatus capable of handling migratory substances made up of molecules falling in a greatly extended range of sizes and weights.

Still another object of the invention is to provide a chromatographic method and apparatus wherein the developing solvent is subject to extremely even distribution over the separation area of the absorbent material.

Still another object is to provide a chromatographic method and apparatus which involves the use of a centrifugal field and wherein the sheet of absorbent material is supported in such manner as to avoid objectionable distortions in the separation pattern.

Still another object is to provide method and apparatus of this character wherein minimum control of atmospheric conditions is required and wherein objectionable evaporation is minimized.

Another object is to provide method and apparatus for fractionating a complex substance and separately collecting the individual desired fractions. The capabilities of the method and apparatus are such that commercial volumes of the separation fractions can be obtained.

Generally speaking, the chromatographic separation or resolution provided by the subject method and apparatus is accelerated by the use of a centrifugal field. The absorbent material in which the separations are made usually is a sheet of felted fiber such as cellulose, nylon, glass or the like. In some instances the absorbent material may consist of a suitably carried layer of starch, diatomaceous earth or porous ceramic tile.

A disk or sheet of absorbent material is mounted for rotation in a generally horizontal plane. The disk, as will be seen, receives support only at spaced intervals, the feature which makes it possible to avoid distortions in the separation pattern.

A migratory substance is applied to an off-center portion of the central region of the disk or sheet of absorbent material in the form of dots, a ring, or partial rings, the absorbent material preferably being first dampened by a developing solvent. As the absorbent material is rotated, e.g. in the range of from 300–1000 r.p.m., developing solvent is added more or less continuously to an off-center portion of the central region. The respective components of the substance migrate radially outward in concentric zones at various and rapid rates determined by the components themselves, the developing solvent, the characteristics of the absorbent material and the strength of the centrifugal field.

By way of example, chromatographic separations of such substances as amino acids, plasma proteins and some dyes and dye mixtures may be achieved by this method and apparatus in time periods of as low as from three to five minutes.

Other objects, advantages and details of the invention will be apparent as the description proceeds, reference being had to the accompanying drawings wherein several embodiments of the invention are illustrated. It will be understood that the description and drawings are illustrative only and that the scope of the invention is to be measured by the appended claims.

In the drawings:

Fig. 2 is a perspective view of a commercial embodiment of various aspects of the invention;

Fig. 4 is a fragmentary elevational view, partly in section, of apparatus embodying other aspects of the invention, particularly the aspect which involves means for collecting desired fractions of a complex substance.

Before describing the apparatus aspects of the invention, the several methods involved in the invention first will be described.

Subject chromatographic method, in its broadest aspect, comprises the steps of applying a substance for separation to a central region of a sheet of absorbent material, for example, filter paper, adding a developing solvent to the sheet in effective relation with the substance and rapidly rotating the sheet while supporting same only at spaced intervals.

In the usual case, the sheet of absorbent material is disposed in a generally horizontal plane, and the developing solvent is added in controlled amount to the sheet more or less continuously during sheet rotation.

Where individual collection of various separation fractions is desired, an additional method step is employed, namely the step of collecting desired fractions of the substance at the periphery of the rotating sheet. Spin-off of the separation fractions is facilitated by providing V-shaped notches in the sheet periphery.

Figure 1:
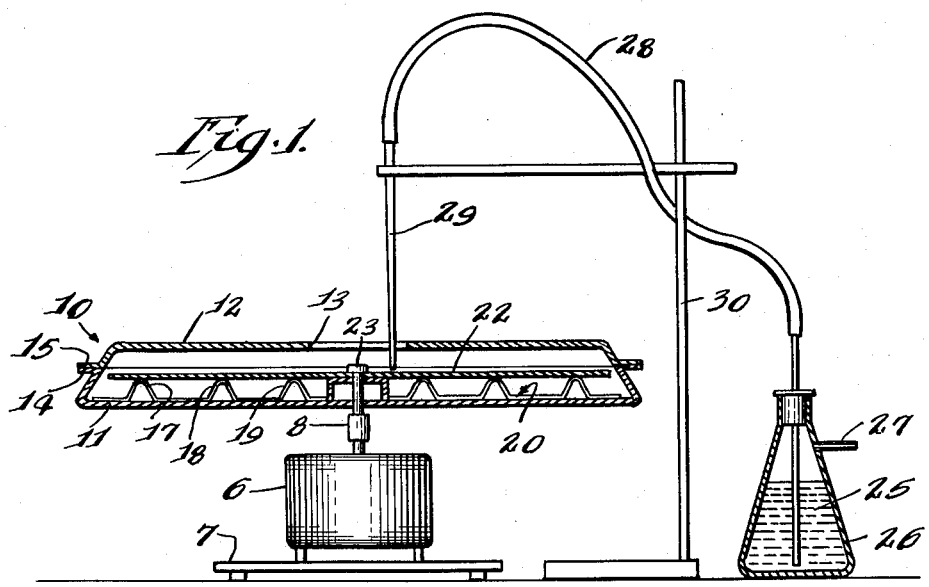
Fig. 1 is a somewhat diagrammatic elevational view, partly in section, of apparatus embodying various aspects of the invention.

Referring first to Fig. 1 of the drawings, apparatus embodying certain aspects of the invention is there shown diagrammatically. A suitable drive means such as a variable speed motor 6 is mounted on a base 7. A drive shaft 8 extends vertically upward from motor 6.

A disk shaped head, generally designated 10, is secured to drive shaft 8, the head being adapted for rotation in a generally horizontal plane. Head 10 comprises a lower plate 11 and a detachable upper plate 12, the latter having a central opening 13 to provide access to the region between the plates. As here shown, the plates are dish shaped and are detachably secured together at peripheral flanges 14 and 15. The atmosphere between the plates is relatively confined, a factor which minimizes evaporation of the developing solvent.

The upper surface of lower plate 11 is provided with a plurality of sheet-support elements 17, 18 and 19. As here shown, these elements take the form of spaced upstanding loops in a plurality of spaced ribs 20, the ribs being secured to the upper face of lower plate 11. The spacing of ribs 20 is shown in Fig. 2. The plurality of spaced sheet-support elements may take other forms, such for example as concentric circular corrugations formed upwardly in lower plate 11 or spaced tangs struck upwardly from lower plate 11.

A sheet of absorbent material 22, centrally secured by means 23 to lower plate 11, is carried by sheet-support elements 17, 18 and 19, it being of critical importance in this apparatus that sheet 22 be supported in this manner rather than being in face-to-face engagement with one or both of the plates. As shown in Fig. 1, the lower face of detachable cover plate 12 is spaced sufficiently from sheet 22 to avoid all possibility of contact. Central opening 13 of cover plate 12 affords access to the central region of sheet 22.

As previously mentioned, the absorbent material of sheet 22 usually is felted fiber such as cellulose, nylon, glass or the like. In some instances it may consist of starch, diatomaceous earth or porous ceramic tile.

The apparatus includes means for introducing a regulated amount of developing solvent to the central region of sheet 22 during sheet rotation. As here shown, developing solvent 25 is contained in an associated flask 26, the upper portion of the flask having a tube 27 for connection to a source of pressurized gas, such for example, as helium. Flask 26 is connected by suitable tubing 28 to a pipet 29 carried by a support 30. As shown in Fig. 1, pipet 29 extends through central opening 13 in cover plate 12 and directs a continuous jet-like stream of developing solvent to an off-center portion of the central region of sheet 22.

For a better understanding of the use and operation of the above described apparatus, a specific example is here set forth. The resultant chromatogram, developed from a veronal solution containing aniline red, bromphenol blue and methyl orange, is shown diagrammatically in Fig. 3. Sheet 22, in the example, is Whatman No. 1 filter paper of 35 cm. diameter. The developing solvent used was veronal buffer.

The dye mixture was initially applied to sheet 22 by an auxiliary pipet (not shown) in radially inward arcs or partial rings 32 and 33 and in a plurality of spaced, radially inward dots 34. With a pipet 29 of 2 lambda capacity and a gas (helium) pressure of 11 pounds per square inch, the flow of developing solvent from the pipet to the central region of sheet 22 was 1.1 ml. per minute. During development of the chromatogram the gas pressure may be increased to provide a greater supply of solvent as the fluid migrates radially outward and the cross sectional area of the advancing front increases.

Figure 3:
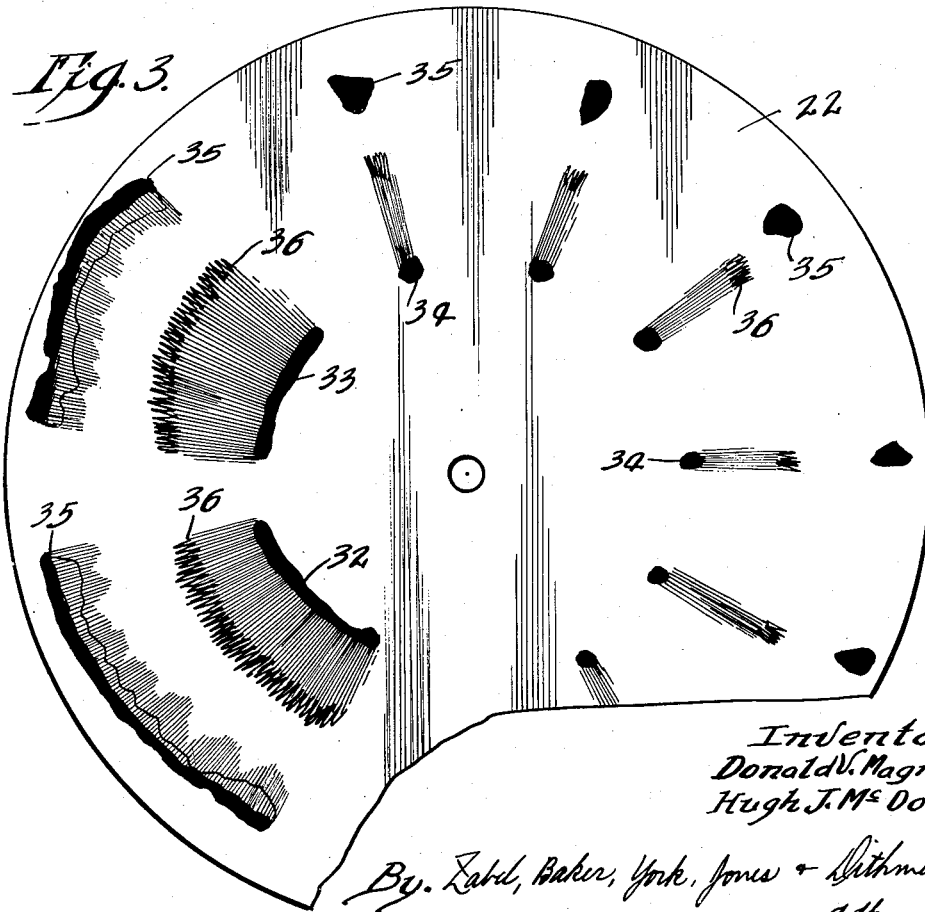
Fig. 3 is a plan view of a chromatogram of the type produced with the method and apparatus of the invention.

In the example given, head 10 was rotated at 550 r.p.m., and the chromatogram illustrated in Fig. 3 was developed in six minutes. The fastest moving component, designated 35 in Fig. 3, is the bromphenol blue, the intermediate component 36 is the methyl orange and the immobile component is the aniline red, the latter being at the inward radial positions designated 32, 33 and 34. It is to be noted that the separation pattern is substantially free of distortion.

By comparison with chromatograms developed from prior systems, it will be noted that the separation of components in the present instance is considerably more sharply defined. This is due to the fact that as the separating fractions of the mixture spread out into rings of progressively increasing diameter, the bands or zones must become increasingly thinner. As a corollary to this fact, it is possible, in general, to work with relatively larger quantities without overloading the absorbent material, since each fraction can be spread out into a circular zone of large diameter where it consequently is distributed over a wide area.

It is possible with this method and apparatus to "spot" several different mixtures or a number of samples of a single mixture on the same sheet or disk and develop the combined chromatograms simultaneously. But cutting out thin sectors from the completed chromatogram and treating them separately with different developers, the interpretation of results from an unknown mixture is greatly facilitated.

The superiority of the present method and apparatus over prior systems also is marked when the length of time required for development is considered. As mentioned, the chromatogram of Fig. 3, which has a diameter of about 30 cm., was developed in six minutes. With prior systems a development time of at least 3½ to 4½ hours or more is required.

Referring now to Fig. 2, the illustrated commercial embodiment of the apparatus includes a housing 40 having an access closure 41. A motor (not shown) is suitably mounted within the housing. A horizontal plate member 42 is mounted for rotation within housing 40 and is suitably driven by the motor, directly or indirectly. A motor switch actuator 43 and speed of rotation regulator control 44 is mounted conveniently on the front of housing 40.

An upright support rod 45 is carried near one edge of a housing and a vertically adjustable horizontal member 46 is carried by rod 45. A tube 47, supported by member 46, carries a pipet 48 which is directed toward an off-center portion of the central region of sheet 50 of absorbent material.

Sheet 50 of absorbent material is centrally secured by means 51 to plate member 42, and it rests on sheet-support elements 52 and 53. Radially outermost sheet-support element 54 is provided for use with sheets of greater diameter than in the case of the one shown, it being noted that the apparatus is capable of accommodating absorbent sheets of various sizes. As in the form shown in Fig. 1, the sheet-support elements constitute spaced loops in spaced ribs 55 which are secured to the upper face of plate 42.

Plate 42 has a concentric corrugation 56 for strengthening, but it is to be understood that a plurality of such concentric corrugations of different diameters are suitable for supporting the absorbent material, thereby serving as an alternate to the ribs 55.

A detachable upper plate, corresponding to plate 12 in Fig. 1, with a central opening is employed in the Fig. 2 apparatus. It has been omitted in the figure for clarity.

The remaining aspect of the invention contemplates the individual collection of desired separation fractions developed by the method and apparatus. Fig. 4 illustrates one form of apparatus which provides for such collection.

Referring to Fig. 4, there is shown a motor 60, a drive shaft 61 and a head assembly 62 carried on the shaft. Head assembly 62 includes a lower plate 63 and sheet-support elements 64, 65 and 66. A sheet 70 of absorbent material is carried by the sheet-support elements. Also included in head 62 is a detachable cover plate 71 having a central access opening 72 in alignment with the central region of sheet 70. A pipet 73 is mounted to direct a stream of developing solvent to an off-center portion of the central region of sheet 70.

A collector means, generally designated 75, is disposed at the periphery of head 62. This collector means includes a series of superposed annular collector rings, the interior of the several rings being designated 76, 77 and 78. These rings, of course, are concentric with head 62.

Since the separation fractions are discharged from the periphery of sheet 70, and the latter in its moist state lacking stability, some means desirably are provided for bridging the gap between the head and the entrances of the collector rings. As here shown, an annular funnel-like ring 80 is disposed between peripheral flanges 81 and 82 of the lower and upper head plates. The wall portions of ring 80 are secured to each other by spaced struts 83. The liquid peripherally discharged from sheet 70 travels into and through ring 80 and is directed into one of the non-rotatable collector rings 76, 77 or 78.

Since each fraction must be collected in a separate collecting ring, relative movement is provided between head 62 and the superposed collector rings. Means may be provided to make one or both vertically adjustable. As shown in Fig. 4, vertical adjustment of the non-rotatable portion of collector means 75 is provided. A plurality of circumferentially spaced racks 85 cooperate with rotatable pinions 86 to effect the desired relative movement between head 62 and the superposed collector rings. Vertical adjustment of the collector rings, of course, is made in synchronism with the peripheral discharge from sheet 70 of the desired separation fractions. Each desired fraction is directed into one of the collecting rings.

As previously mentioned, it has been found that discharge of the fractions from sheet 70 is facilitated by providing V-shaped notches in the periphery of the sheet.

From the above description it is thought that the construction and advantages of our invention will be readily apparent to those skilled in the art. Various changes in detail may be made without departing from the spirit or losing the advantages of the invention.

Having thus described our invention what we claim as new and desire to secure by Letters Patent is:

1. Chromatographic apparatus comprising a housing having an access closure, a motor within said housing, a horizontal plate member mounted for rotation within said housing and driven by said motor at predetermined speeds, a sheet of absorbent material, means mounting said sheet in spaced relation with said plate member, means for introducing a regulated amount of developing solvent to the central region of said sheet during sheet rotation, and means at the periphery of said sheet for collecting the separation fractions of a substance subjected to apparatus action, said means comprising a series of superposed annular collecting rings open toward the sheet periphery and means for varying the elevation of the respective rings in synchronism with the peripheral discharge from said sheet of desired separation fractions.

2. Chromatographic apparatus comprising a drive means, a horizontal plate member mounted for rotation and driven by said drive means, a sheet of absorbent material, means mounting said sheet in spaced relation with said plate member, means for introducing a regulated amount of developing solvent to the central region of said sheet during sheet rotation, and collector means at the periphery of said sheet, said collector means comprising a series of superposed annular rings open toward the sheet periphery and means for varying the relative elevation of the respective rings and the sheet periphery in synchronism with the peripheral discharge from said sheet of desired separation fractions.

3. Chromatographic apparatus comprising a drive means, a horizontal plate member mounted for rotation and driven by said drive means at predetermined speeds, a sheet of absorbent material, means mounting said sheet in spaced relation with said plate member, a cover member carried by said plate member in spaced relation with said sheet, said cover member having a central opening for access to the central region of said sheet, means for introducing a regulated amount of developing solvent to the central region of said sheet during sheet rotation, and collector means at the periphery of said sheet, said collector means comprising a series of superposed annular rings open toward the sheet periphery and means for varying the relative elevation of the respective rings and the sheet periphery in synchronism with the peripheral discharge from said sheet of desired separation fractions.

References Cited in the file of this patent
UNITED STATES PATENTS 2,386,591    Campbell _____ Oct. 9, 1945

FOREIGN PATENTS

S 42481 1Va/12g    Germany _____ Oct. 18, 1956

OTHER REFERENCES

McDonald et al.: Chromatographic Methods, vol. 2, No. 1, H. Reeve & Co., Inc., N.Y. 7, N.Y., March 1957, pages 1–2.

Caronna: La Chimica e L'Industria, vol. 37, 1955, pages 113–114.

Cramer: Paper Chromatography, McMillan & Co. Ltd., London, 1954, pages 20–30.

Krishna Murthy et al.: "Quantitative Determination of Amino Acids by Circular Paper Chromatography," Analytical Chemistry, vol. 27, No. 9, September 1955, pages 1396–1399.